United States Patent [19]

Harris

[11] 4,326,871
[45] Apr. 27, 1982

[54] COOLING TUBES FOR GLASS FILAMENT PRODUCTION APPARATUS

[75] Inventor: Walter W. Harris, Toledo, Ohio
[73] Assignee: Manville Service Corporation, Denver, Colo.
[21] Appl. No.: 120,022
[22] Filed: Feb. 11, 1980
[51] Int. Cl.³ .......................................... C03B 37/025
[52] U.S. Cl. ...................................... 65/12; 65/374.12
[58] Field of Search .............. 65/1, 12, 374 M, 374.12

[56] References Cited

U.S. PATENT DOCUMENTS

| | | | |
|---|---|---|---|
| 3,002,226 | 10/1961 | Warthen | 65/12 X |
| 3,219,106 | 11/1965 | Ahern | 165/134 |
| 3,392,779 | 7/1968 | Tilbrook | 165/47 |
| 3,468,644 | 9/1969 | Leaman | 65/12 |
| 3,997,309 | 12/1976 | Harris | 65/12 |
| 4,214,884 | 7/1980 | Martin | 65/12 |

FOREIGN PATENT DOCUMENTS 924507 4/1973 Canada .

Primary Examiner—Robert L. Lindsay, Jr.
Attorney, Agent, or Firm—Robert M. Krone; Joseph J. Kelly; Richard K. Thomson

[57] ABSTRACT

This invention relates to glass filament production. Conventionally the hollow cooling tubes and/or solid metal bars utilized in the making of continuous glass fibers have been constructed of high temperature corrosion resistant materials whose costs are exorbitant for extensive present day factory operations. The present invention dramatically reduces the price of cooling tubes 24 suitable for use in the making of glass filaments by coating or cladding a relatively inexpensive base or substrate metal 48 such as nickel, Inconel, molybdenum, copper, alloys thereof or a refractory material with a high temperature corrosion resistant material 50 such as the noble metals, e.g. platinum, palladium, rhodium, iridium, gold, silver or alloys thereof. Fins 52 which may be attached to the cooling tubes 24 may be made either of a solid noble metal or may also be coated or clad in the same manner as the cooling tubes 24.

4 Claims, 2 Drawing Figures

COOLING TUBES FOR GLASS FILAMENT PRODUCTION APPARATUS

TECHNICAL FIELD

This invention relates to glass handling apparatus and more particularly to cooling tubes for use with a glass filament forming apparatus.

BACKGROUND OF PRIOR ART

In one well known method and apparatus of making fibers from a molten inorganic material, such as glass, a plurality of small orifices or orifice tips are formed in the base of a molten glass chamber or bushing. The molten material flows from the bushing out of the orifice tips forming cones at the end of the tips. When the temperature of the molten material at these cones is properly controlled, continuous fibers or filaments can be drawn from the tips of the cones.

Cooling means are commonly utilized for controlling the temperature of the cones in order to effectively and accurately regulate the transition of the molten glass viscosity. One prior art manner of controlling the temperature of the cones is to place a tube adjacent to the cones and to cause a cooling medium such as water to flow through the tube at a rate necessary to maintain a desired cone temperature. The molten glass viscosity conventionally is first maintained at a relatively low level and a very fluid condition proximate the bottom of the chamber adjacent the discharge orifices in order to promote an effective flow therein and a full uninterrupted discharge. Thereafter the viscosity is brought to relatively higher viscosities following discharge from the orifices to govern the attenuation of the fluid stream into a filament of apt dimensions and to increase its coherency thereby minimizing breakage.

Conventional cooling means which have heretofore been utilized proximate the area of the fluid glass stream as it emerges from the orifices include either tubes carrying water or other liquid coolants and/or solid metal bars positioned transverse to the length of the bushing. The tubes or bars have traditionally been composed of noble or similar exotic metals or alloys thereof. These materials effectively endure the high temperatures and corrosive vapors encountered proximate the bushing. As is well known, the environment around the cooling tubes including the area around the cooling tube supports, is harsh in terms of high temperature, corrosiveness caused by the temperature, volatiles from the molten material and water spray typically used around the bushing. At times, depending on the material used, this harsh environment deteriorates the cooling tubes or bars requiring one or more to be replaced at more or less periodic time intervals.

Previously the materials used include platinum, gold, silver, palladium, and the like. However, the costs of such materials are exorbitant for extensive factory operations.

BRIEF SUMMARY OF INVENTION

It is an object of the present invention to provide an economical and effective cooling means for use with a glass filament forming apparatus.

Another object of the instant invention is the provision of relatively inexpensive and long lasting cooling means useful in the making of continous glass filaments.

A further object of the invention is the provision of coated or clad cooling means in which a noble metal is coated on a less expensive substrate.

These and other objects are attained in a glass filament forming apparatus by the present invention in which cooling tubes and/or bars are provided which comprise a base metal clad with a noncorrosive metal such as the precious or noble metals. The base metals may be selected from the group consisting essentially of nickel, Inconel, molybdenum, copper, alloys thereof or refractory metals. Additionally, the precious metal may be selected from the group consisting essentially of platinum, palladium, rhodium, iridium, gold, silver or alloys thereof.

DETAILED DESCRIPTION AND PREFERRED EMBODIMENTS

Figure 1:
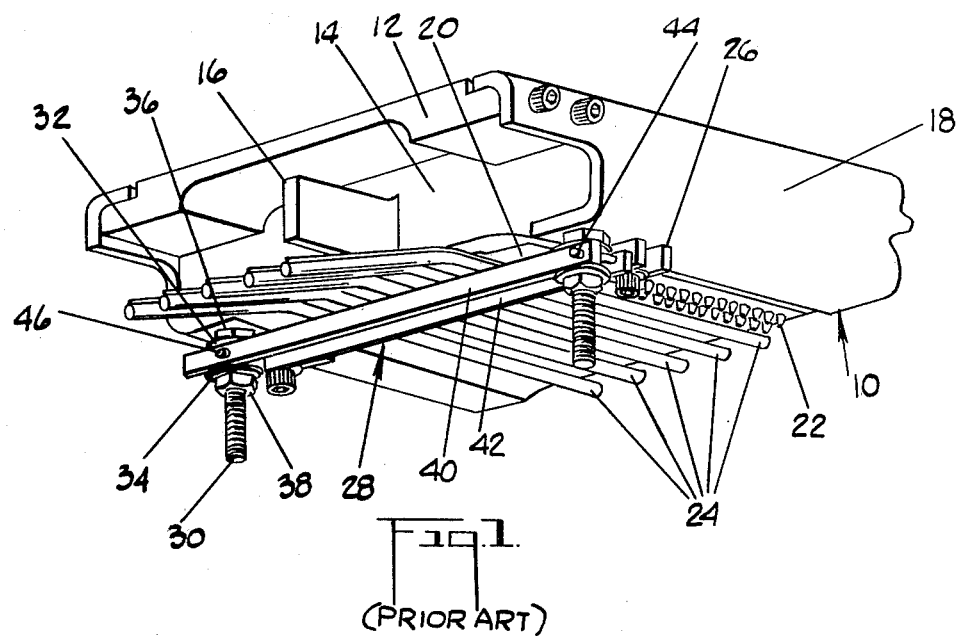
FIG. 1 is a partial perspective view of a conventional fiberizing bushing utilizing an example of the cooling means of the present invention.

Referring now to FIG. 1, a conventional resistance heated fiberizing bushing 10 utilizing the cooling means of the present invention is shown. The bushing 10 is fixed on conventional bushing supports 12 located at each end of the bushing and is provided with two end walls 14, each containing a lug 16 for attaching electrical leads (not shown). Sidewalls 18, and a bottom wall or tip plate 20 complete the construction of the bushing. The tip plate 20 contains a plurality of orifices or nozzles, each of which is surrounded by a tip 22 extending below the tip plate 20.

A plurality of cooling means 24 are spaced along the width of the tip plate 20 in such a manner that a cooling means 24 is juxtaposed between two rows of tips with one row on each side of a cooling mean 24. In the present example the cooling means are shown as cooling tubes 24 although in practice the cooling means 24 could be constructed as solid cooling bars joined to heat sinks such as a water cooled tube (not shown) and could be located across the bushing instead of along the bushing as shown for the cooling tube 24 in FIG. 1. The alignment and spacing of each cooling tube 24 with respect to the tips 22 adjacent to the cooling tube is important and is maintained with alignment members 26. The members 26 have slots or notches at proper intervals across their length into which the cooling tubes 24 are fitted. The notches in the various alignment members 26 are aligned ensuring that the cooling tubes 24 are likewise aligned.

The cooling tubes 24 are held in the notches of the alignment members 26 by a plurality of cooling tube supports 28 which in turn are fixed by a plurality of bolts 30, washers 32, 34 and upper and lower flange nuts 36 and 38, respectively. Particularly the washer 32 is and preferably both the washers 32 and 34 are attached to the nuts 36 and 38 in any suitable manner, as for example by brazing, pins, etc. This prevents the washers from causing problems when an operator is changing the cooling tubes.

The cooling tubes 24 are maintained at the proper position below the tip plate 22 by adjusting the upper nuts 36 to the correct position and subsequently raising the support members 28 to a snug position against the upper washers 32 by the use of the lower washers 34 and the lower nuts 38.

In the embodiment shown in FIG. 1, the support members 28 comprise two bars 40 and 42 held in a spaced apart position by two pins 44 and 46. For reasons of economy, conventional groove or spring pins are preferred. The ends of these pins are smaller in diameter than the central portion, thus forming a shoulder that butts against the inside surfaces of the bars 40 and 42 and maintains the desired spacing between the bars. The ends of the pins 44 and 46, which have a smaller diameter, fit tightly into holes drilled into the bars 40 and 42. By selecting a pin material having a higher coefficient of thermal expansion than the bars, such as stainless steel pins and molybdenum alloy bars, the fit becomes even tighter when the support is exposed to elevated service temperatures.

As shown in FIG. 1, the cooling tubes 24 are usually bent downward on at least one end to facilitate their connection to lines bringing cooling fluid, usually water, to the cooling tubes. The opposite ends of the cooling tubes are frequently open. Water flowing freely from the open ends into a catch basin which readily indicates that the tubes are not plugged.

According to the present invention more practical and inexpensive cooling tubes for the foregoing application and system are produced by coating or cladding a base metal, such as nickel, Inconel, molybdenum and copper, alloys thereof or refractory metals with a noble or precious metal such as platinum, palladium, rhodium, iridium, gold, silver or alloys thereof. The use of the base metals allow the reduction of the unit cost of the cooling tubes while the coatings of the noble metals on the relatively inexpensive substrates prevents the rapid corrosion and deterioration of the cooling tubes in the very aggresive ambient conditions of high temperature combined with the corrosive vapors encountered proximate the glass filament bushing. The use of nickel as the base metal is preferred because it provides a good bond with all of the mentioned precious metals. The selection of the precious metal is based mainly on the relative costs of the metals which change daily on the commodity markets. The clad cooling tubes may be made by any conventional cladding method and have been found to perform satisfactorily in the working environment.

Figure 2:
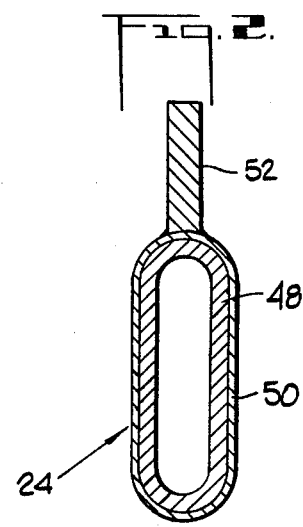
FIG. 2 is a cross-sectional view of a cooling tube constructed in accordance with the present invention.

FIG. 2 shows a cooling tube 24 of the present invention in which a substrate tube 48, made of one of the base metals referenced above, is coated or clad with a precious metal 50, of the types mentioned earlier. A fin 52 may be suitably affixed to the tube 24 in order to increase the strength and thermal performance of the tube. In the embodiment shown, the fin may be made of solid precious metal such as platinum, although it is possible to clad a base metal such as nickel with a precious metal such as platinum and then braze or otherwise suitably attach the clad fin to the clad cooling tube. While FIG. 2 indicates that the cross section of the tube 24 is oval, the tube could be provided with any cross section including a circular cross section. Additionally and also optionally, the tube 24 could be provided with one or more solid or clad fins which are disposed at appropriate locations about the periphery of the tube.

To provide adequate physical integrity which allows the cooling tubes to endure the aggresive and rigorous conditions encountered proximate the bushing commensurate with the most effective cooling through heat exchange and removal, the thickness of the base metal in the tube walls should be of a thickness ranging between 0.010 to approximately 0.030 inches and preferably about 0.015 to 0.025 inches thick. The thickness of the precious metal should be of a thickness ranging between about 0.004 to approximately 0.008 inches and preferably 0.005 to 0.007 inches.

Cooling tubes of the construction of this invention in service with a conventional glass forming apparatus should effectively resist the harsh environmental conditions encountered therein, in particular the very high temperatures and corrosive vapors of the glass melt over a prolonged period of 24 months of continuous or intermittent production. Prior cooling tubes using noble or exotic type metals such as platinum-palladium alloy tubes and platinum-rhodium tubes are prohibitively expensive, whereas the clad tubes of this invention cost much less while performing substantially as effectively.

While only one embodiment of the invention has been shown herein it will be evident that various changes in the construction and arrangement of parts may be resorted to without departing from the scope of the invention as defined by the claims.

I claim:

1. In an apparatus for forming glass filaments comprising the combination of: a chamber for the containment of molten glass, said chamber having a base, a plurality of small orifices in said base for discharging fine streams of molten glass from said chamber for attenuation into filaments; a plurality of cooling means positioned beneath and in proximity to said base, said cooling means being arranged to extend intermediate said orifices to cool glass filaments being drawn from said chamber, wherein said cooling means are each formed as a hollow tube from a base metal clad with a layer of noble metal; said base metal being selected from the group consisting of nickel, inconel, molybdenum, copper, alloys of these materials, and refractory metals, said hollow cooling tube having a wall thickness within the range of 0.010 to 0.030 inches; said noble metal being selected from the group consisting of platinum, palladium, rhodium, iridium, gold, silver, and their alloys, said noble metal cladding layer having a secondary wall thickness within the range from about 0.004 to 0.008 inches.

2. The apparatus of claim 1, wherein a fin is fixedly attached to each of said cooling tubes, the material of said fin comprising a noble metal.

3. The apparatus of claim 1, wherein the hollow cooling tubes have a base metal wall thickness within the range of 0.015 to 0.025 inches.

4. The apparatus of claim 1, wherein the thickness of said noble metal is in the range from about 0.005 to 0.007 inches.

* * * * *